United States Patent
Simon

(10) Patent No.: US 7,006,845 B2
(45) Date of Patent: Feb. 28, 2006

(54) METHOD AND SYSTEM FOR INTERFACING A PORTABLE TRANSCEIVER IN A TELEMATICS SYSTEM

(75) Inventor: Anthony Luke Simon, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 592 days.

(21) Appl. No.: 10/115,761

(22) Filed: Apr. 3, 2002

(65) Prior Publication Data
US 2004/0203554 A1    Oct. 14, 2004

(51) Int. Cl.
*H04M 1/00* (2006.01)
(52) U.S. Cl. ............... 455/553.1; 455/41.2; 455/41.3; 455/556.1
(58) Field of Classification Search ............... 455/345, 455/550, 11.1, 435, 557, 456, 41, 6.6, 568, 455/426, 456.5, 404, 414, 12.1, 575.9, 41.2, 455/556.2, 553.1, 426.1, 456.1, 456.2, 456.6, 455/41.3, 7, 552–553, 556.1; 340/425.5, 340/426.16, 426.19, 995.12; 320/352, 522
See application file for complete search history.

(56) References Cited

U.S. PATENT DOCUMENTS

| | | | |
|---|---|---|---|
| 5,537,673 A | 7/1996 | Nagashima et al. | 455/346 |
| 6,693,517 B1 * | 2/2004 | McCarthy et al. | 340/425.5 |
| 6,697,638 B1 * | 2/2004 | Larsson et al. | 455/553.1 |
| 6,701,161 B1 * | 3/2004 | Wendling | 455/556.1 |
| 2002/0065037 A1 * | 5/2002 | Messina et al. | 455/12.1 |
| 2002/0077144 A1 * | 6/2002 | Keller et al. | 455/550 |
| 2002/0115436 A1 * | 8/2002 | Howell et al. | 455/426 |
| 2002/0142803 A1 * | 10/2002 | Yamamoto | 455/557 |
| 2002/0197954 A1 * | 12/2002 | Schmitt et al. | 455/41 |
| 2003/0224840 A1 * | 12/2003 | Frank et al. | 455/575.9 |

* cited by examiner

*Primary Examiner*—Pablo N. Tran
(74) *Attorney, Agent, or Firm*—Anthony Luke Simon

(57) ABSTRACT

A method of interfacing a portable transceiver in a telematics system comprising the steps of: a) bringing a portable wireless transceiver into proximity of a vehicle, wherein the portable wireless transceiver has short range and long range wireless transceiving functions; b) automatically switching the portable wireless transceiver from a power-off state to a power-on state in response to a short range wireless signal from the vehicle; and c) operating the portable wireless transceiver as a telecommunications device for at least one system within the vehicle through a short range wireless link.

14 Claims, 3 Drawing Sheets

METHOD AND SYSTEM FOR INTERFACING A PORTABLE TRANSCEIVER IN A TELEMATICS SYSTEM

TECHNICAL FIELD

This invention relates to a method and system for interfacing a portable transceiver in a telematics system.

BACKGROUND OF THE INVENTION

It is known in the telematics services industry to have vehicles communicate through wireless transceivers (such as cellular telephones) embedded in vehicles and through wireless transceivers that are portable hand-held devices. Portable devices are interfaced with the vehicle either through hardware links such as a cradle in the vehicle or through short-range wireless links of the type used in wireless networking. Short range wireless links typically use very low power, operate at upper megahertz or in the gigahertz frequencies, and have the ability to communicate a limited range, for example 30 to 90 feet (or more depending upon local regulations and/or the standard implemented).

Portable hand-held transceivers, such as analog or digital cellular phones, typically have a power-off state, where all functions are disabled, and a power-on state, where functions are enabled. When in the power-on state, the device may be in a power conservation mode, which conserves energy, but still allows initiation of receipt and transmission of calls.

SUMMARY OF THE INVENTION

Advantageously, this invention provides a method and system for interfacing a vehicle and hand-held transceiver.

Advantageously, this invention provides a method and system for interfacing a vehicle and hand-held transceiver to provide enhanced functionality over a wireless link. These advantages are achieved by implementing new functions into the vehicle and hand-held transceiver that allow seamless integration between the hand-held transceiver and the vehicle. In an example advantage, a potential for failure of communications services due to the user leaving the hand-held transceiver powered off is eliminated.

Advantageously then, according to a preferred example, this invention provides a method of interfacing a portable wireless transceiver in a telematics system comprising the steps of: a) bringing the portable wireless transceiver into a proximity of a vehicle, wherein the portable wireless transceiver has short range and long range wireless transceiving functions; b) automatically switching the portable wireless transceiver from a power-off state to a power-on state in response to a short range wireless signal from the vehicle; and c) operating the portable wireless transceiver as a telecommunications device for at least one system within the vehicle, wherein the portable wireless transceiver is coupled to the vehicle through a short range wireless link.

In yet another preferred example, this invention advantageously also comprises the steps of: removing the portable wireless transceiver from the proximity of the first vehicle; and automatically switching the portable wireless transceiver from the power-on state to the power-off state in response to the removing of the portable wireless transceiver from the proximity of the first vehicle.

BRIEF DESCRIPTION OF THE DRAWINGS

The present invention will now be described by way of example with reference to the following drawings, in which.

DESCRIPTION OF THE PREFERRED EMBODIMENT

Figure 1:
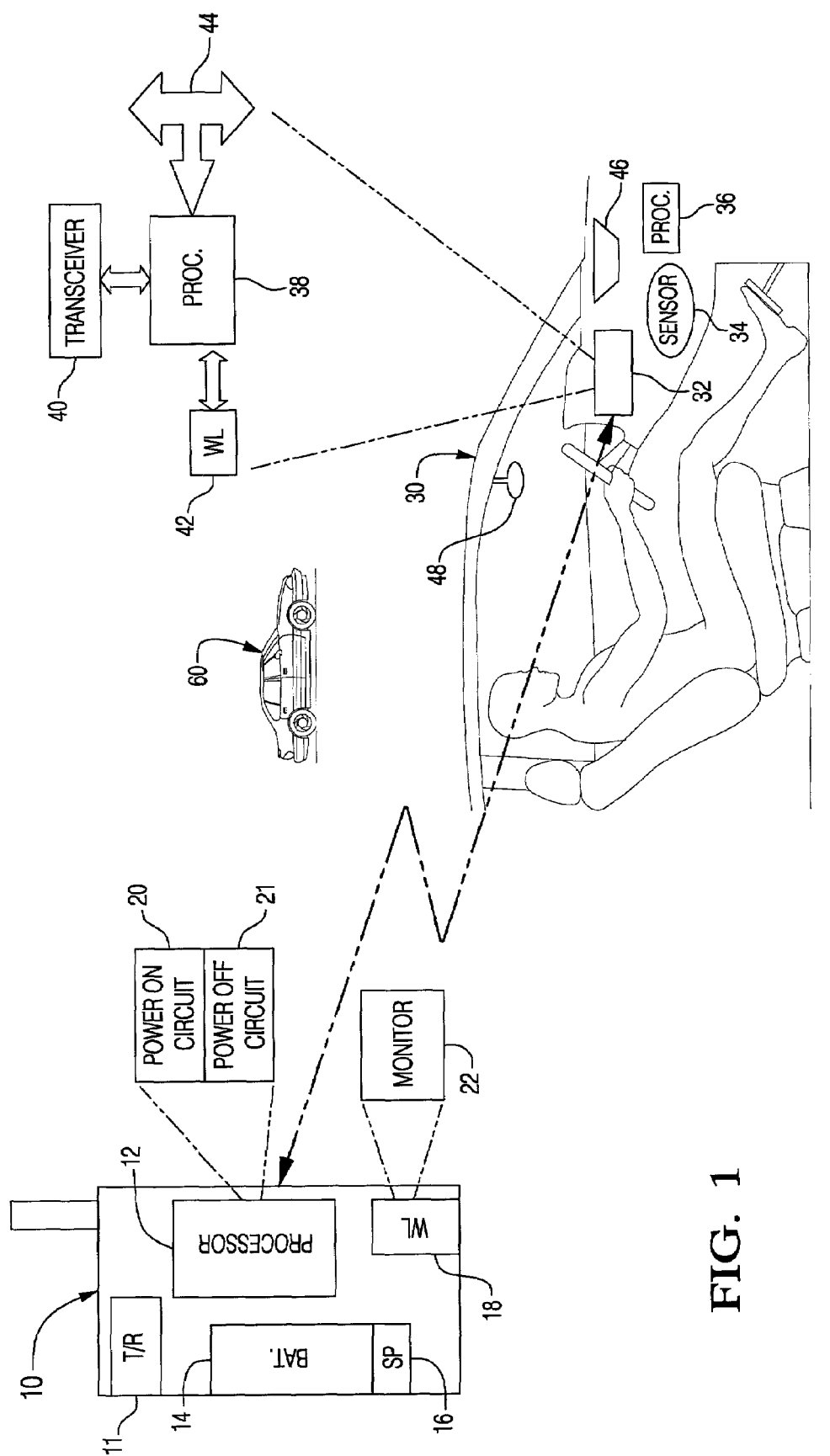
FIG. 1 illustrates an example system for implementing this invention.

FIG. 1 illustrates an example system according to this invention including a wireless transceiver 10 such as, for example, a hand-held portable cellular telephone that includes one or more modes for communicating over one or more wireless public or private telecommunications networks. The wireless transceiver 10 may be a stand-alone unit or may be embedded in another portable electronic unit such as, for example, a hand-held or laptop computer. The transceiver 10 includes circuitry 11 (long-range transceiver) for transmitting and receiving over the telecommunications network as controlled by the processor (or controller) 12 in a known manner. The processor 12 is coupled to power-on and power-off functions 20 and 21, respectively, of a known type that power on and power off the wireless transceiver 10 in response to known user inputs, such as an operator depressing one or more buttons dedicated to power control functions. Additionally, the power-on and power-off functions respond to signals from wireless link unit 18 to control power-on and power-off functions of the wireless transceiver 10 as described herein.

The wireless link unit 18 is a short-range transceiver of any type suitable for establishing a working connection with one or more compatible wireless link units on other devices. The particular standard used for the short range transceiver to establish the short range wireless link described herein can be any published standard desired by the system designer capable of meeting the functions described herein, or may be a custom standard that deviates from published standards, for example, to include increased security or to include functions not included in published standards. The implementation of short-range wireless communications or network links is known to those skilled in the art.

The wireless transceiver 10 includes a battery 14 for providing power to the device in a known manner. The wireless transceiver 10 also includes a standby power function 16 for maintaining the wireless link unit 18 in standby mode allowing the wireless link unit 18 to perform monitor function 22, monitoring for wireless interfacing even when the wireless transceiver 10 is in the power-off state. The standby power function 16 may be part of the battery 14, which will not adversely affect battery life due to the low current draw required to maintain the wireless link circuit 18 in standby mode. Alternatively, a separate small battery within the wireless transceiver 10 or within the wireless link unit 18 can provide the standby power function. This separate battery can be charged by the battery 14, for example, when the unit is in the power-on state or can be a replaceable battery.

The vehicle 30 includes a telematics unit 32, with its internal processor 38 coupled to a wireless link unit 42 for short-range wireless communications for wireless networking and bussing functions. The wireless link unit 42 is capable of interfacing with wireless link unit 18. The telematics unit 32 may also include its own transceiver 40 for communicating through the wireless telecommunications network, but this transceiver 40 is optional if the system designer desires that the wireless transceiver 10 be the system's primary device for communicating with the wireless telecommunications network.

The processor 38 is coupled to a bus 44 (of any known type, including but not limited to Class II, or other hardwired bus or any functional wireless bus) for communicating with other in-vehicle processors 36 and/or sensors 34 for performing known telematics services functions. The telematics unit 32 also interfaces with the vehicle audio system (represented by speaker 46), to broadcast audible messages to the vehicle user and receives inputs from one or more in-cabin microphones 48. Additionally, if a visual display and keyboard or touch screen are included in the vehicle, the telematics unit 32 may interface with the vehicle operator through those units.

Reference 60 represents a vehicle that does not have authority to access services from wireless transceiver 10 in accordance with this invention.

Figure 2:
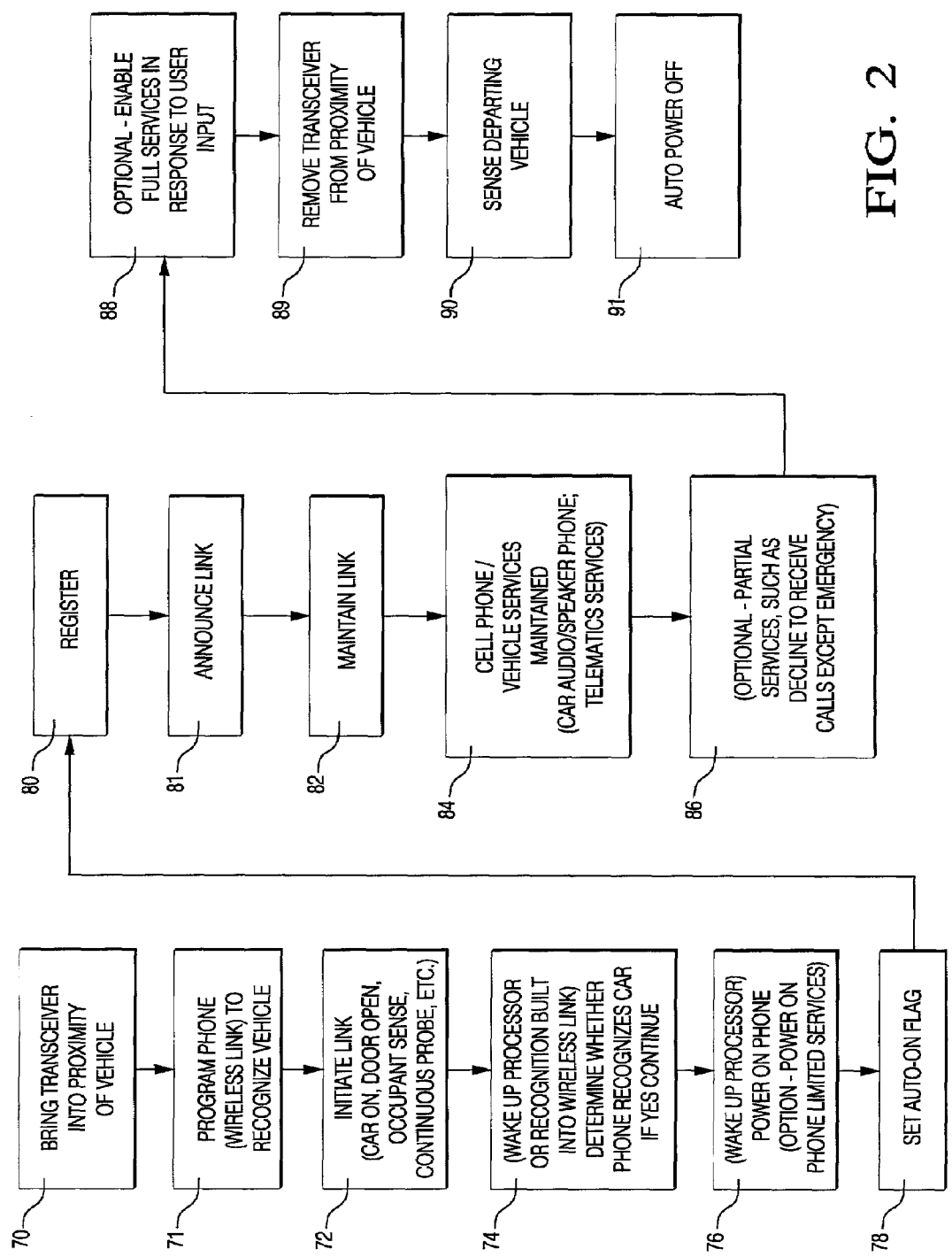
FIG. 2 illustrates example method steps and example functions of the system shown in FIG. 1.
Figure 3:
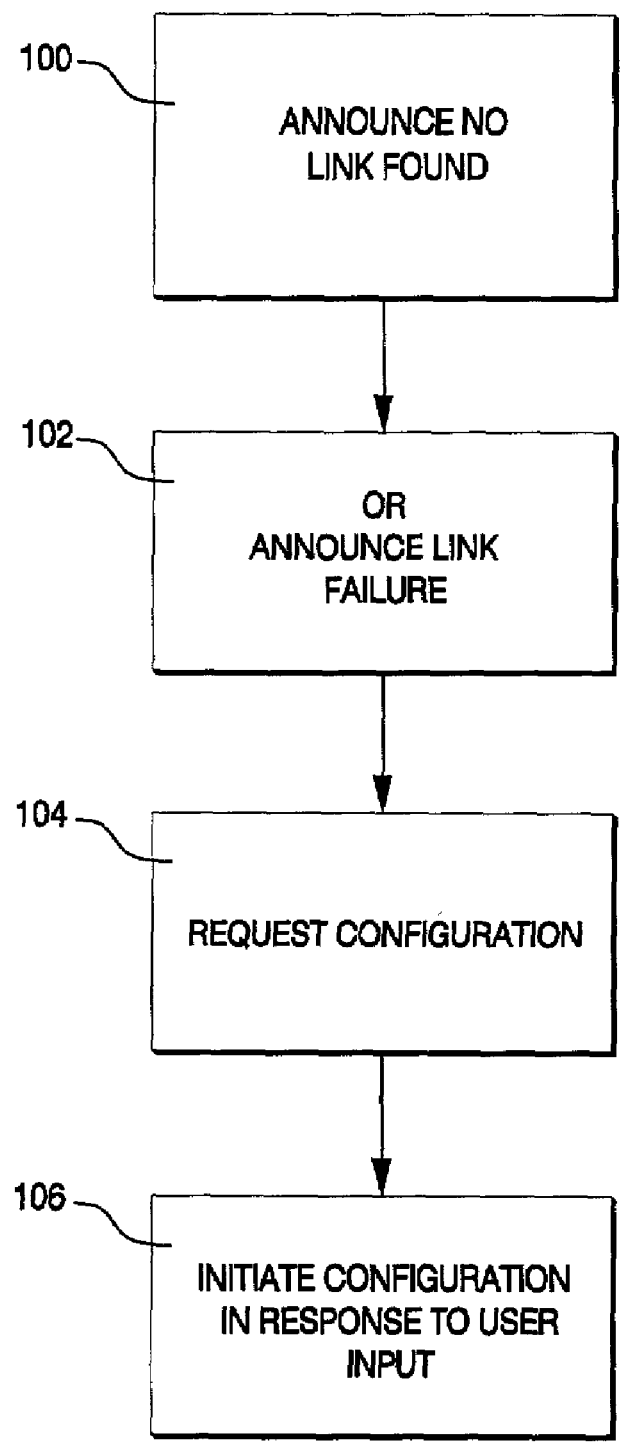
FIG. 3 illustrates further example method steps and example functions of the system shown in FIG. 1.

Referring now also to FIG. 2, at step 70 the wireless transceiver is brought into proximity of vehicle 30, for example, by the user possessing the wireless transceiver 10 approaching or getting into the vehicle. Step 71 represents the configuration of the wireless transceiver 10 to recognize the vehicle 30. Any number of methods can achieve this. For example, the wireless link unit 18 can be pre-programmed by the vehicle OEM and sold to the user or phone retailer for installation into wireless transceiver 10 for the benefit of the vehicle owner. Or for example, referring now also to FIG. 3, under control of processor 38, when the vehicle 30 is started, if it does not establish a link with a wireless transceiver because the transceiver has not been configured to accept a link from vehicle 30, the telematics unit 32 reports this fact to the user through the vehicle audio system (step 100). At step 102, the vehicle can announce that there was a failure to link to the wireless transceiver 10. In this example, though the wireless transceiver 10 is not configured to recognize the vehicle, the wireless link unit 18 does allow the vehicle to recognize that it is present, though no operating network link supporting telematics services is created. The telematics unit 32, knowing that a wireless transceiver 10 suitable for use is present, requests, at step 104, to the user through one of the user interfaces (such as audio system 46) whether the vehicle should initiate configuration of the wireless transceiver 10.

If the user answers affirmatively through voice command or other input such as a push button or touch screen, then at step 106 the vehicle initiates configuration of the wireless transceiver 10. Any type of wireless configuration designed to ensure a secure connection with the wireless transceiver can be used, and many examples of technology for creating secure connections are known to those skilled in the art. In one example, the vehicle offers a recognition code to the wireless transceiver 10. The wireless transceiver 10 then waits for input from the user authorizing the wireless transceiver 10 to accept and store the recognition code. Once the wireless transceiver accepts and stores the recognition code, the wireless transceiver will automatically accept network connectivity to the vehicle when in proximity of the vehicle allowing communications through the wireless link units 18 and 42. It will be understood that recognition code when used in this example means any type of code or algorithm or method for allowing secure connection, including but not limited to those using various encryption technologies or password technologies, whether static or dynamic. It will also be recognized that, in an alternative to the wireless transceiver 10 storing a recognition code from the vehicle, the vehicle stores an access or recognition code received from the wireless transceiver, or both the vehicle and wireless transceiver exchange codes.

Step 72 represents the initiation of the wireless link recognition function by the vehicle. In a preferred example of this function, the vehicle telematics unit 32 probes through its wireless link unit 42 for wireless transceiver 10. This probing may be initiated upon opening of the car door, upon ignition on of the vehicle, upon sensing an occupant within the vehicle or other appropriate trigger, or this probing can be a continuous or periodic function, using low current draw through wireless link unit 42 so as not to drain the vehicle battery.

Step 74 represents the recognition process within wireless transceiver 10. Once the wireless transceiver 10 senses the short-range probe signals from the vehicle, the wireless transceiver 10 determines whether the vehicle probing it has authority to automatically power-on the wireless transceiver 10. This is accomplished either through the wireless link unit 18 waking up the processor 12 for the limited purpose of determining whether to accept a link with vehicle 30 or through functions or circuitry (such as an application specific integrated circuit) included within or in support of wireless link unit 18. The latter example has the benefit of not requiring wake-up of the cell phone processor until after authorization for establishing a link has been verified.

Step 76 represents the power-on of the wireless transceiver 10, which occurs if, at step 74, it is determined that he vehicle has authority to establish a wireless link with the wireless transceiver 10. In one example of this invention, when the wireless transceiver 10 powers-on automatically through interaction of the wireless link units 18 and 42, the wireless transceiver 10 powers on to a limited services state. That is, the system assumes that since the wireless transceiver was switched off, the user does not desire to receive incoming calls, but desires that the phone be available only in an emergency, such as in the case of a supplemental inflatable restraint deployment sensed by telematics unit 32, or depression of an emergency help button on the telematics unit 32. Thus, in this example, the wireless transceiver 10 will be switched on but will not ring in response to incoming calls and, if the system designer desires, will not acknowledge to the network receipt of network information of an incoming call. Additionally, the normal operating display for the wireless transceiver 10 (such as showing the various menu options) may remain disabled or only partially enabled. Block 86 represents operation of the wireless transceiver 10 in the partial services mode.

If the wireless transceiver 10 determines that the vehicle 32 is not authorized to command automatic power-on of the wireless transceiver 10, then the wireless transceiver 10 will not power on in response to communications from vehicle 32. This security feature ensures that only the vehicle or vehicles authorized to utilize wireless transceiver 10 will have access to its services.

Block 78 represents the processor 12 within the wireless transceiver 10 setting a flag (any signal within any type of memory function) indicating that the wireless transceiver has been powered on through the creation of an automatic link. This flag enables the wireless transceiver to automatically power off at block 91. The automatic power off is in response to the removal of the wireless transceiver from the proximity of the vehicle 30 (block 89) and the sensing (block 90) within the wireless transceiver 10 that there is no longer a short range wireless link to the vehicle 30. This occurs when the occupant with the wireless transceiver 10 departs the vehicle and/or range of the wireless link unit 42 and/or the vehicle 30 terminates the wireless link due to sensing no occupants within the vehicle 30. If the flag is not set at block 78, then when the wireless transceiver 10 departs the proximity of the vehicle 32, the wireless transceiver 10 does not automatically power off.

Block 80 represents the optional registration of the wireless transceiver 10 to the telecommunications network occurring immediately after power-up or as otherwise preferred according to the telecommunications network standards. At block 81, the vehicle announces over the vehicle audio system establishment of the wireless link with the wireless transceiver 10. This informs the vehicle operator that the vehicle telematics system has communications capabilities and also that the wireless transceiver 10 has been automatically powered-on. If desired, the system designer can implement an override function allowing the user to terminate the wireless link to the vehicle.

Blocks 82 and 84 represent the functions of maintaining the wireless network link between the telematics unit 32 and the wireless transceiver 10 while the vehicle is in operation and/or the wireless transceiver 10 is in proximity to the vehicle allowing the short range wireless link between units 18 and 42.

Block 84 represents the services that the wireless transceiver 10 provides to the vehicle while it is networked to the vehicle through the wireless link. Any suitable telematics service or in-vehicle wireless communications services may be enabled as the system designer desires. Typical services include, but are not limited to: (a) allowing the in-vehicle speaker and microphones to be enabled as part of a speaker phone system for the wireless transceiver 10 for hands-free operation of wireless phone calls through the telecommunications network; (b) emergency communications services such as (i) in response to supplemental inflatable restraint deployment, or other sensor, (ii) depression of an emergency services button, and (iii) notification for detection of car theft and tracking of stolen vehicles, etc.; and (c) convenience services such as voice access to e-mail and other voice information services. In another example, if the vehicle has a built in transceiver 40 for wireless telecommunications, then the wireless transceiver 10 can be implemented as (a) a back-up transceiver or (b) an alternative transceiver in case the user has two different billing methods and prefers using one over the other.

Block 88 represents an optional function that may be implemented on a system that, in response to automatic power-on as described above, enables only a sub-set of the full functions of wireless transceiver 10. At block 88, if the user desires to enable the remaining functions of the wireless transceiver 10, the user provides an input to the wireless transceiver 10, such as depressing the power on button, which input then enables the full functions of the wireless transceiver 10. Alternatively, the user input to enable the full functioning of the wireless transceiver 10 can be by voice command through the voice interface built within the telematics unit 32. Responsive to a user command, telematics unit 32 sends a signal over the wireless link unit 42, to unit 18 commanding wireless transceiver 32 to enable all functions.

What is claimed is:

1. A method of interfacing a portable wireless transceiver in a telematics system comprising the steps of:

a) bringing the portable wireless transceiver into a proximity of a first vehicle, wherein the portable wireless transceiver includes a first short range wireless transceiving function and long range wireless transceiving function, and the first vehicle includes a second short range wireless transceiving function;

b) automatically switching the portable wireless transceiver from a power-off state to a power-on state in response to a short range wireless signal from the first vehicle; and c) operating the portable wireless transceiver as a telecommunications device for at least one system within the first vehicle, wherein the portable wireless transceiver is coupled to the first vehicle through a short-range wireless link.

2. The method of claim 1, also comprising the steps of:

removing the portable wireless transceiver from the proximity of the first vehicle; and automatically switching the portable wireless transceiver from the power-on state to the power-off state in response to the removing of the portable wireless transceiver from the proximity of the first vehicle.

3. The method of claim 2, wherein the step of automatically switching the portable wireless transceiver from the power-on state to the power-off state occurs only if the portable wireless transceiver was in the power-off state when the portable wireless transceiver was brought into the proximity of the first vehicle.

4. The method of claim 1, also comprising the steps of:

configuring the portable wireless transceiver to recognize a predetermined vehicle;

sensing the short-range wireless signal from the first vehicle;

determining, within the portable wireless transceiver, whether the first vehicle is the predetermined vehicle wherein the steps b) and c) operate only when the first vehicle is the predetermined vehicle.

5. The method of claim 4, also comprising the steps of:

announcing over the vehicle audio system that no wireless link is established if the first vehicle is not the predetermined vehicle;

requesting, over the vehicle audio system, authorization to initiate configuration of the portable wireless transceiver to recognize the first vehicle as the predetermined vehicle; and initiating configuration of the portable wireless transceiver in response to a user input responding to the request.

6. The method of claim 1, also comprising the steps of:

setting a flag in the portable wireless transceiver in response to the automatic switching the portable wireless transceiver from the power-off state to the power-on state;

removing the portable wireless transceiver from proximity of the first vehicle; and automatically switching the portable wireless transceiver from the power-on state to the power-off state in response to the removing of the portable wireless transceiver from the proximity of the first vehicle only if the flag is set.

7. The method of claim 1, wherein the step of automatically switching the portable wireless transceiver from the power-off state to the power-on state enables only partial functionality of the portable wireless transceiver.

8. The method of claim 7, wherein the partial functionality excludes ringing in response to incoming calls.

9. The method of claim 7, also comprising the step of:

while partial functionality of the portable wireless transceiver is enabled, enabling full functionality of the portable wireless transceiver in response to manual depression of a power-on switch.

10. The method of claim 1, also comprising the step of: announcing over an audio system of the first vehicle establishment of the short-range wireless link.

11. The method of claim 10, also comprising the step of: disabling the short-range wireless link in response to user input to the portable wireless transceiver.

12. The method of claim 1, also comprising the step of: maintaining the portable wireless transceiver in a power off state in response to a short-range wireless signal from a second vehicle.

13. The method of claim 1, also comprising the step of: providing power to the short range wireless transceiving function within the portable wireless transceiver from a standby power source separate from a primary battery of the portable wireless transceiver.

14. A system for interfacing a portable wireless transceiver in an in-vehicle telematics system comprising:

a) a portable wireless transceiver having a first short-range transceiver unit and a long-range wireless transceiver unit; and b) a second short-range transceiver unit coupled to the vehicle telematics system;

c) a monitor within the portable wireless transceiver capable of recognizing signals from the vehicle telematics system transmitted from the second short range transceiver unit to the first short range transceiver unit; and d) a power-on circuit within the portable wireless transceiver responsive to the monitor, wherein the portable wireless transceiver switches from a power-off state to a power-on state in response to a short range wireless signal from the vehicle, wherein the portable wireless transceiver operates as a telecommunications device for at least one system within the vehicle, wherein the portable wireless transceiver is coupled to the vehicle through a short-range wireless link.

* * * * *